United States Patent [19]
Dan et al.

[11] Patent Number: 5,559,671
[45] Date of Patent: Sep. 24, 1996

[54] BI-DIRECTIONAL SHOCK ISOLATION MOUNTING SYSTEM AND METHOD

[75] Inventors: James R. Dan, Fullerton; Charles R. Caverley, La Palma; Steven A. Schechter, Fountain Valley; Steven S. Seeley, Corona; Chris A. Jameson, Fullerton; David A. Lee, Santa Monica, all of Calif.

[73] Assignee: Hughes Aircraft Company, Los Angeles, Calif.

[21] Appl. No.: 268,684

[22] Filed: Jun. 30, 1994

[51] Int. Cl.$^6$ ............................. H05K 7/14; G06F 1/16; F16M 13/00

[52] U.S. Cl. .................... 361/682; 248/562; 248/581; 248/619; 248/917

[58] Field of Search ................... 248/917–923, 248/562, 576, 581, 601, 619, 638; 364/708.1; 361/680–683, 724–727; 312/7.2, 223.1–223.6

[56] References Cited

U.S. PATENT DOCUMENTS

| | | | |
|---|---|---|---|
| 4,033,542 | 7/1977 | Moehle et al. | 248/601 |
| 5,021,763 | 6/1991 | Obear | 248/562 X |

*Primary Examiner*—Michael W. Phillips
*Attorney, Agent, or Firm*—G. S. Grunebach; M. W. Sales; W. K. Denson-Low

[57] ABSTRACT

An apparatus shock isolation mounting system includes an apparatus, a base, and an apparatus chassis that carries the apparatus and is vertically slidable with respect to the base. A pair of oppositely disposed, self-centering preloaded springs with internal guide rods are attached between the apparatus chassis and the base. A pair of shock dampers are attached between the apparatus chassis and the base at different locations. The preloaded springs and the shock dampers cooperate to prevent damage to the apparatus by vibration and shock loadings.

13 Claims, 3 Drawing Sheets

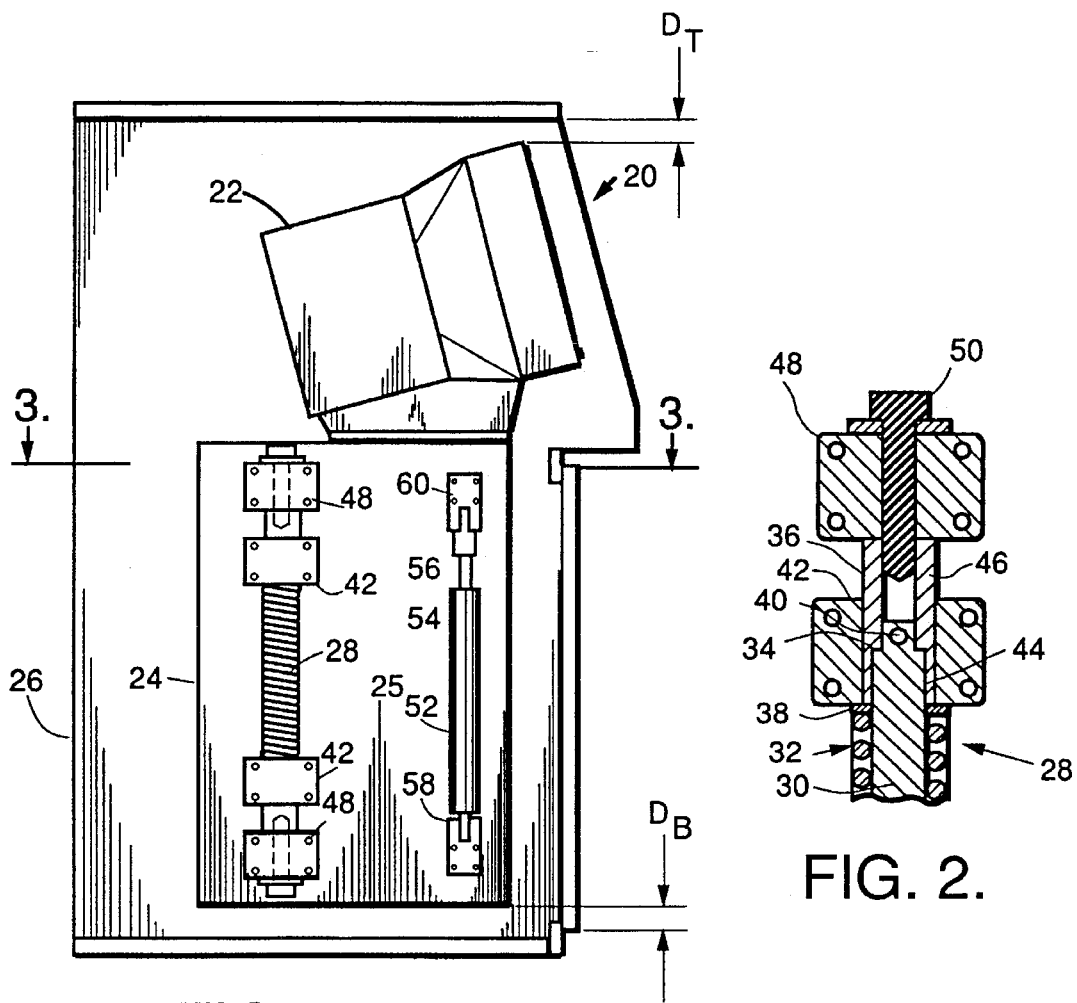
FIG. 1.
FIG. 2.
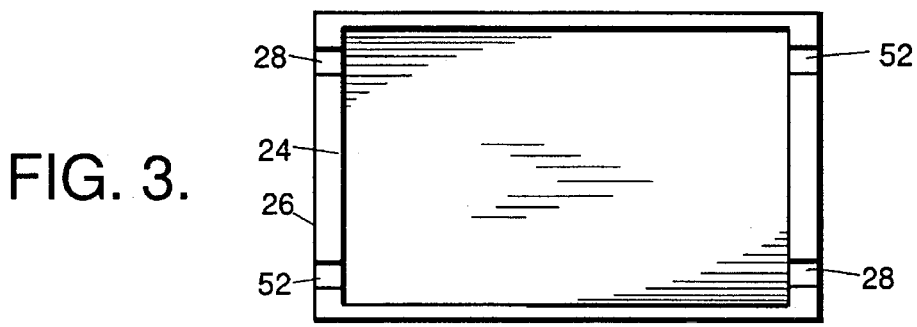
FIG. 3.
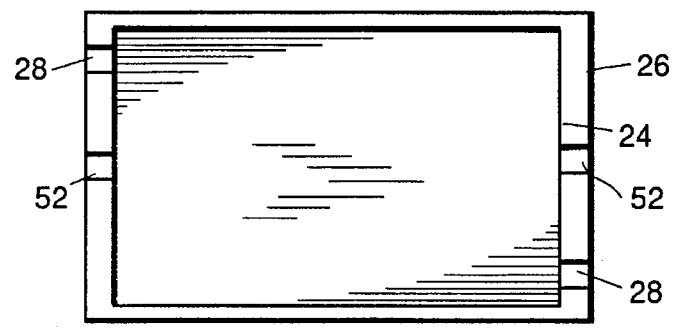
FIG. 4.

BI-DIRECTIONAL SHOCK ISOLATION MOUNTING SYSTEM AND METHOD

BACKGROUND OF THE INVENTION

This invention relates to a mounting system that isolates an apparatus from unacceptably high shocks, and, more particularly, to such a mounting system for use in supporting a wide range of electrical equipment such as video displays, power supplies, mass storage devices, circuit card assemblies, computer equipment and the like in a shipboard environment.

Commercial and military vehicles such as seagoing vessels carry a wide range of electronic apparatus, such as, for example, video displays. Each piece of the electronic apparatus is carried by an apparatus chassis that meets tight space constraints, inasmuch as the electronic control centers of the ships or other vehicles are often quite crowded with equipment and it is desirable to place the operators in close proximity with each other.

The electronic apparatus carried by its chassis is ultimately supported from the ship structure, and vibrations and shocks experienced in the ship structure can be transmitted to the electronic apparatus. In some instances, the vibrations and shocks are minor and not potentially damaging to the electronic apparatus. In other instances, particularly on military vessels, the vibrations and shocks can be quite large and potentially damaging to the electronic apparatus.

To prevent disabling damage to, and ensure continuing operation of, the electronic apparatus, it is common practice to utilize "ruggedized" electronic apparatus in such situations. (As used herein "ruggedized" includes "militarized", although in some contexts these terms are viewed as applying to different constructions.) A ruggedized piece of apparatus is similar in function to conventional commercial off-the-shelf (COTS) apparatus. The ruggedized electronic apparatus differs from the COTS apparatus in that it typically utilizes versions of components that are less susceptible to vibration and shock damage and is constructed with extensive internal shock mounting of the components. Consequently, the ruggedized apparatus is usually considerably more expensive and may be larger in size than its COTS counterpart.

It would be desirable to utilize COTS electronic apparatus rather than ruggedized versions in shipboard and other vibration/shook-prone environments, both to reduce costs and to conserve space. That has not been possible to date due to the inability to achieve the required degree of isolation and localization of movement within the available space limitations. Conventional spring isolators such as wire rope or arched coil types cannot be used because they permit too much sway of the chassis and the electronic apparatus.

SUMMARY OF THE INVENTION

This invention provides an approach for isolating large, heavy electronic and other apparatus from vibration and shock that might otherwise cause damage to the apparatus. (The term "shock" as used herein refers to mechanical loadings, not electrical shock.) The approach of the invention permits COTS electronic apparatus to be used safely in an environment that would otherwise require the use of ruggedized apparatus. It also permits ruggedized apparatus to be used in even more severe shock situations than the apparatus is otherwise capable of withstanding. There is little sway space required in the approach of the invention, reducing the overall external size of the cabinet base as compared with prior shock mounting techniques and also reducing the risk to nearby personnel from sway of the heavy apparatus subsequent to a shock. The apparatus of the invention cannot amplify applied vibration levels, in the manner of a conventional spring isolator.

In accordance with the invention, an apparatus system comprises an apparatus, a base, an apparatus chassis that carries the apparatus and is slidable with respect to the base, and means for supporting the apparatus chassis from the base. (As used here, "carried by" or comparable terms used in relation to the apparatus and the apparatus chassis include the cases where the apparatus is within the chassis or affixed externally to the chassis.) The means for supporting includes at least one self-centering preloaded spring attached between the base and the apparatus chassis, and at least one shock damper attached between the apparatus chassis and the base. Preferably, a pair of self-centering preloaded springs are mounted to the chassis diametrically opposite from each other on a line through the center of gravity of the chassis, and a pair of shock dampers are provided.

In the absence of vibration and shock, the apparatus chassis, which carries the apparatus, is suspended by the self-centering preloaded springs from the base at a position determined by the positions of stops in the self-centering spring. In the preferred approach, the base is a cabinet which encloses the apparatus chassis and apparatus. During relatively low-level shocks or low-level vibrations, typically less than about 5g's (a "g" is the force of gravity, and 5g's is five times the force of gravity), the preloaded springs hold the apparatus chassis and the apparatus at a substantially constant vertical position so that an operator can readily view the apparatus in cases where the apparatus is a video display, for example. Such low-level shocks or low-level vibrations do not pose a significant hazard to the apparatus, so there is no need to interrupt the man/machine interface by an energy-absorbing movement. The shock dampers play no role in these situations.

As the shock amplitude becomes larger, typically more than about 5g's, the spring force of the preloaded springs is overcome, and the apparatus chassis and apparatus (collectively, the "supported mass") move up or down responsive to the shock. The higher the shock, the greater and more rapid the movement of the supported mass. In this regime, the shock dampers limit the acceleration of the supported mass to a value established by the design of the shock dampers. The inventors have determined that most COTS electronic apparatus is tolerant of shocks of up to about 35g's without sustaining damage. The shock dampers are therefore provided to limit acceleration to no more than about this value. The value of the maximum shock tolerance can be controllably varied, however, by changing the springs (and thereby the spring constant) and the dampening character of the shock dampers.

Shock isolation in the horizontal planes (i.e., side-to-side and front-to-back) is not required. Shock test data obtained during the development of the present invention show that the worst case shock levels occurring in the horizontal planes during vertical or 30° side-over shock inputs are below 32g's for hard mounted or non-isolated equipment and therefore do not require further isolation.

During the response to the shock, the supported mass can move an inch or more in either vertical direction (i.e., up or down) responsive to the shock loading, because the mass is supported at about the midpoint of the travel of the preloaded springs. If a visual man/machine interface is provided by the electronic apparatus, there may be a brief interruption of clear viewing on the order of one second during this shock-responsive travel. However, the preloaded springs quickly return the apparatus to the original viewing position after the shock loading subsides, and the apparatus system is ready for additional service. Operational effectiveness of the display is not substantially adversely affected, because during this brief interruption it is highly likely that the operator will be so violently shaken or thrown from his/her chair that observation of the display would not occur during the interruption in any event.

The support means for the apparatus chassis and apparatus desirably includes a support rod that slidably extends between the slidable apparatus chassis and the base cabinet. The support rod may be, and preferably is, internal to the self-centering preloaded springs as a part of its mechanism. The support rod prevents lateral sway (i.e., side-to-side or front-to-back movement in the horizontal plane) of the apparatus chassis with respect to the base cabinet. Elimination or near-elimination of sway is a key advantage of the invention, because it reduces the required size of the base cabinet, which would otherwise be sized to accommodate the sway, reduces interruption of the man/machine visual interface, and reduces the likelihood of injury to personnel or other equipment resulting from violent lateral swaying.

The present invention provides an important advance in the art of support and suspension of vibration-sensitive and shock-sensitive electronic and other apparatus. The apparatus of the invention provides shock protection, minimizes the amount of sway space required within the apparatus base cabinet (thereby maximizing the remaining volume available for mounting equipment), and does not amplify vibration input levels in the manner possible with conventional isolator systems. The shock protection is bidirectional, protecting against both upward and downward shocks. The present approach thereby maintains a usable man-machine interface under adverse vibration and shock loadings such as experienced in a shipboard environment. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a side elevational view, with a base panel removed, of a preferred embodiment of the apparatus system of the invention with the apparatus chassis at the neutral position;

FIG. 2 is a side sectional view of an end portion detail of a self-centering preloaded spring;

FIG. 3 is a schematic sectional view of the apparatus system of FIG. 1, taken along line 3—3;

FIG. 4 is a schematic top sectional view similar to that of FIG. 3, showing another embodiment of the apparatus system;

DETAILED DESCRIPTION OF THE INVENTION

Figure 5:
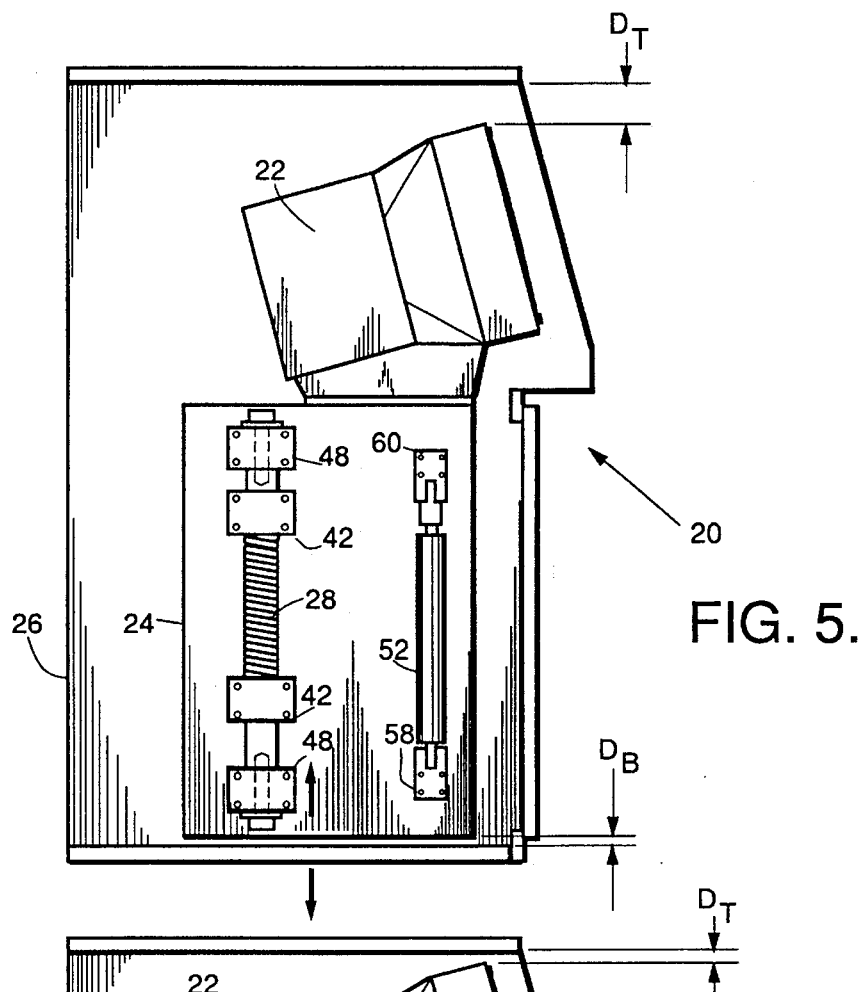
FIG. 5 is a side elevational view similar to that of FIG. 1, with the apparatus chassis at its full downward position during shock loading.

FIG. 1 depicts an apparatus system 20 according to the invention. The apparatus system 20 includes an apparatus 22, preferably an electronic apparatus. The apparatus 22 is here illustrated as a video monitor, but could be other types of electrical and electronic apparatus such as other display devices, power supplies, mass storage devices, circuit card assemblies, or computer equipment, for example. Support of a video monitor represents one of the most challenging applications of apparatus support, because it requires both prevention of damage to the apparatus and the maintenance of a man/machine visual interface to the maximum extent possible.

The apparatus 22 is carried by an apparatus chassis 24, generally in the form of a rectangular box. The apparatus 22 may be mounted interior to the chassis or fixed exteriorly to it. The apparatus chassis 24 is slidably connected by a support means 25 to a base 25 in a manner to be described. In the preferred approach, the base 26 is a cabinet which receives the apparatus chassis 24 therein. The base 25 may be free-standing on a floor as shown, or be supported by some further structure. The base apparatus chassis 24, and support means 25 are built with sufficient strength to support the apparatus 22 on the apparatus chassis 24. The apparatus chassis 24 is free to move in the vertical direction of FIG. 1 relative to the base 26.

Figure 8:
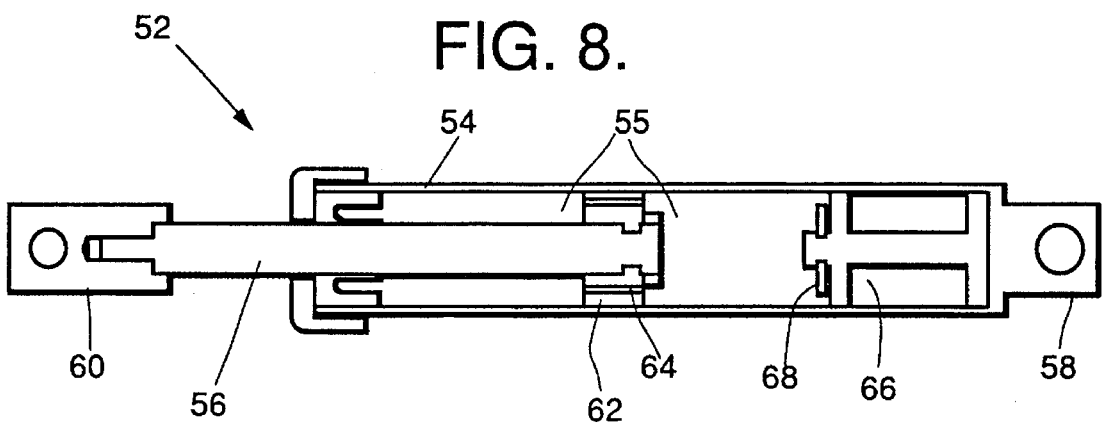
FIG. 8 is a sectional view of a shock damper.

The support means 25 connects the apparatus chassis 24 to the base 26 so as to permit the apparatus chassis 24 to slide relative to the base 26. The support means 25 includes at least one, and preferably two, self-centering preloaded springs 28 attached between the apparatus chassis 24 and the base 26. The support means 25 further includes at least one, and preferably two, shock dampers 52 attached between the apparatus chassis 24 and the base 26. FIG. 2 shows a detail of one end of one of the self-centering preloaded springs 28 (both ends have the same structure). FIG. 8 illustrates a shock damper 52 in sectional view. FIGS. 3 and 4 illustrate two embodiments of the arrangement of the springs 28 and shock dampers 52 around the lateral periphery of the apparatus chassis 24.

Referring to FIG. 2, the self-centering preloaded spring 28 is built around an elongated inner shaft 30 with an overlying coil spring 32. The inner shaft 30 has an external shoulder region 34 near its end, and a support shaft 36 with an interior shoulder is slidably engaged over the shoulder region 34, with a thrust washer 38 positioned between the support shaft 36 and the end of the coil spring 32. During this assembly, the coil spring 32 is compressed by a desired degree to set the system preload value, and a roll pin 40 is inserted in a bore through the shoulder region 34 and the support shaft 36 to lock the support shaft 36 to the inner shaft 30 with the coil spring 32 partially compressed between the thrust washers 38 located near each end of the preloaded spring 28. An inner attachment 42 is placed over the support shaft 36 with a bushing 44 between the attachment 42 and the support shaft 36 so that the support shaft 36 can slide through the inner attachment 42 when a sufficient force is applied to the end of the support shaft 36. The inner attachment 42 comprises a plate or block with screw or bolt holes therethrough. In the present application, the inner attachments 42 near each end of the preloaded spring 28 are attached to the base 26.

The outwardly facing end of the support shaft 36 is internally threaded with threads 46. An outer attachment 48 is fixed to these threads 46 of the support shaft 36 with a cap screw 50. In the present application, the outer attachment 48 is similar in structure to the inner attachment 42 in that it comprises a plate or block with screw or bolt holes therethrough. The outer attachment 48 at each end of the preloaded spring 28 is attached to the apparatus chassis 24. The points of attachment of the inner attachment 42 and the outer attachment 48 may be reversed, so that the inner attachment 42 may be attached to the apparatus chassis 34, and the outer attachment 48 may be attached to the base 36, without affecting the operation of the system.

At least one, and preferably two, shock dampers 52 are attached between the base 25 and the apparatus chassis 24. The shock dampers 52 function as rate-dependent energy dissipators. Referring to FIG. 8, each shock damper 52 is formed as a hollow tube 54 filled with a liquid 55, preferably a compressible silicone fluid. A piston head 62 with a rod 56 extending therefrom is immersed in the liquid. The piston head has one or more orifices 64 therethrough. When the tube 54 is moved slowly with respect to the rod 56, the liquid 55 flows slowly through the orifice 64 and there is little damping effect. When the tube 54 is moved rapidly with respect to the rod 56, the liquid is rapidly extruded through the orifice 64 so that its kinetic energy is converted to heat and a damping effect results. An accumulator 66 and control valve 68 within the tube 54 provide a degree of controllability of the response rate of the shock damper 52. In the presently preferred design, the tube 54 is provided with a tube attachment 58 that is fixed to the base 26, and the rod 56 is provided with a rod attachment 60 that is fixed to the apparatus chassis 24. The shock damper 52 therefore is activated when the apparatus chassis 24 moves relative to the base 26.

Suitable shock dampers are available commercially.

While it might be possible for some applications to combine the preloaded spring structure and the shock damper structure into a single unit, that approach is not preferred for the present application. Such a combined structure has a substantially larger diameter and would require a larger base enclosure. Separating the self-centering spring function and the shock damper function into two devices maintains a relatively small size for each device.

In operation, the preloaded spring 28 permits controlled sliding movement of the apparatus chassis 24 with respect to the base 26. When a relatively small load is applied to the preloaded spring assembly through the inner attachments 42, as by a low-level vertical vibration applied to the base 26, the resultant vertical force is too low to overcome the spring preload. There is virtually no movement of the outer attachments 48 resulting from this vibrational loading, so that the apparatus chassis 24 and thence the apparatus 22 does not experience destructive vibration amplification as is common with conventional spring isolators.

However, when a larger vertical load is applied, as by a high-amplitude shock applied to the base 26, the coil spring 32 flexes past its point of preload and loses contact with the inner attachment 42 at one end so that the support shaft 36 and thence the outer attachment 48 move responsively. This movement is simultaneously translated to the shock damper 52 to absorb the energy of the shock loading. The shock damper 52 does not come into operation when only the smaller vibrations are experienced, due to the above-described functioning of the preloaded spring 28.

The combination of inner shaft 30, bushing 44, inner attachment 42, support shaft 36, cap screw 50, and outer attachment 48 serves as a rigid guide rod and attachment that prevents lateral sway (sideways) movement of the apparatus chassis 24 with respect to the base 26. Consequently, essentially no sway space is required between the apparatus chassis 24 and the base 26. The result is that the base cabinet may be made with a size that is only slightly larger than the apparatus chassis 24, thereby maximizing the available volume for mounting equipment. There is no lateral movement that interferes with visual observation of the apparatus 22 or that could cause injury to personnel when a shock occurs.

FIGS. 3 and 4 illustrate in sectional views the close sliding fit between the apparatus chassis 24 and the base 26. In each case, the self-centering, preloaded springs 28 are positioned at diagonally opposite corners of the rectangular apparatus chassis 24. These figures also depict possible alternative arrangements of the shock dampers 52. In the embodiment of FIG. 3, the shock dampers are placed near the other two diagonally opposite corners of the apparatus chassis 24. In the embodiment of FIG. 4, the shock dampers 52 are placed much closer to the center of gravity of the apparatus chassis 24 to improve their responsiveness to shock loadings, and may be placed at the centerline as illustrated.

Figure 6:
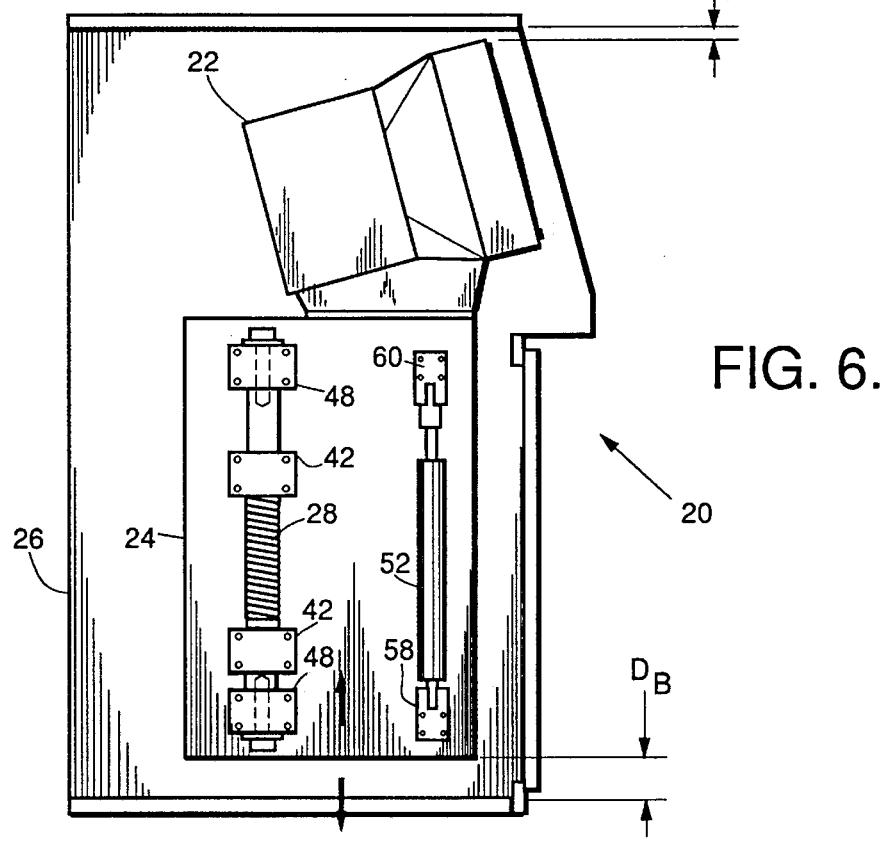
FIG. 6 is a side elevational view similar to that of FIG. 1, with the apparatus chassis at its full upward position during shock loading.

FIGS. 1, 5, and 6 together illustrate the relative movements of the components during low-level vibrational loading and high-amplitude shock loading. (Vibrational and shock loadings may be conducted according to standard procedures. See, for example, MIL-STD-167-1 or MIL-S-901D (NAVY) for procedures used in testing components for use in shipboard applications.) Important parameters of interest in these figures are the bottom clearance $D_B$ between the apparatus chassis 24 and the base 26, and the top clearance $D_T$ between the top of the apparatus 22 and the base 26, which is shown as a cabinet that encloses the apparatus 22. Initially, FIG. 1, the self-centering, preloaded springs 28 are adjusted so that $D_B$ and $D_T$ are approximately equal. In a full size prototype of the invention built by the inventors, the initial value of $D_B$ was 1.5 inches and the initial value of $D_T$ was about 1.3 inches. When the system 20 is subjected to low-level vibrations, less than about 5g's in the prototype, the preloaded springs 28 maintain the apparatus chassis 24 and apparatus 22 very close to these initial positions.

A high-amplitude shock of more than 5g's may be viewed as a transient periodic signal composed of an upward component followed by a downward component. Such a shock results in the movements of springs 28 and dampers 52 described previously. FIG. 5 shows the results of the initial upward movement of the base 26 relative to the apparatus chassis 24 for a force of about 60–80g's. $D_B$ is reduced to about 0.5 inches and $D_T$ is increased to about 2.3 inches. In the following portion of the shock, as shown in FIG. 6, the reverse movement occurs so that $D_B$ is increased to about 2.5 inches and $D_T$ is reduced to about 0.3 inches. After the shock passes, the self-centering springs 28 return the apparatus chassis 24 to the position shown in FIG. 1. It will be appreciated that the numerical clearance values discussed for the working prototype were determined by the structural dimensions, spring constants, damping parameters, and other factors chosen for this particular application. These values will vary depending upon other values selected for other applications. A virtue of the present approach is that it permits selection of these values to achieve an acceptably reduced shock to the apparatus. Stated alternatively, the greater the shock reduction required, typically the larger the displacements required to absorb the applied shock.

Thus, during ordinary low-level vibration, the apparatus 22 remains virtually fixed in position and does not move laterally or vertically so that the operator may easily view the video display. When a high-amplitude shock occurs, the apparatus 22 moves vertically by up to 1 inch (in the prototype design) in a carefully controlled manner so that the shock is absorbed without damaging the apparatus 22, but again does not move laterally by any substantial amount. In a typical example, when a vertical shock amplitude of 60–80g's is applied to the base 26 (simulating a shock to the ship or other vehicle in which the system 20 resides), the apparatus 22 experiences a reduced shock of about 35g's or less as it travels through a 2-inch range of movement as the energy of the shock is damped. Experience has shown that many commercial off-the-shelf (COTS) components such as video displays can withstand 35g's but cannot withstand the higher shock loadings of 60–80g's without sustaining damage.

Figure 7:
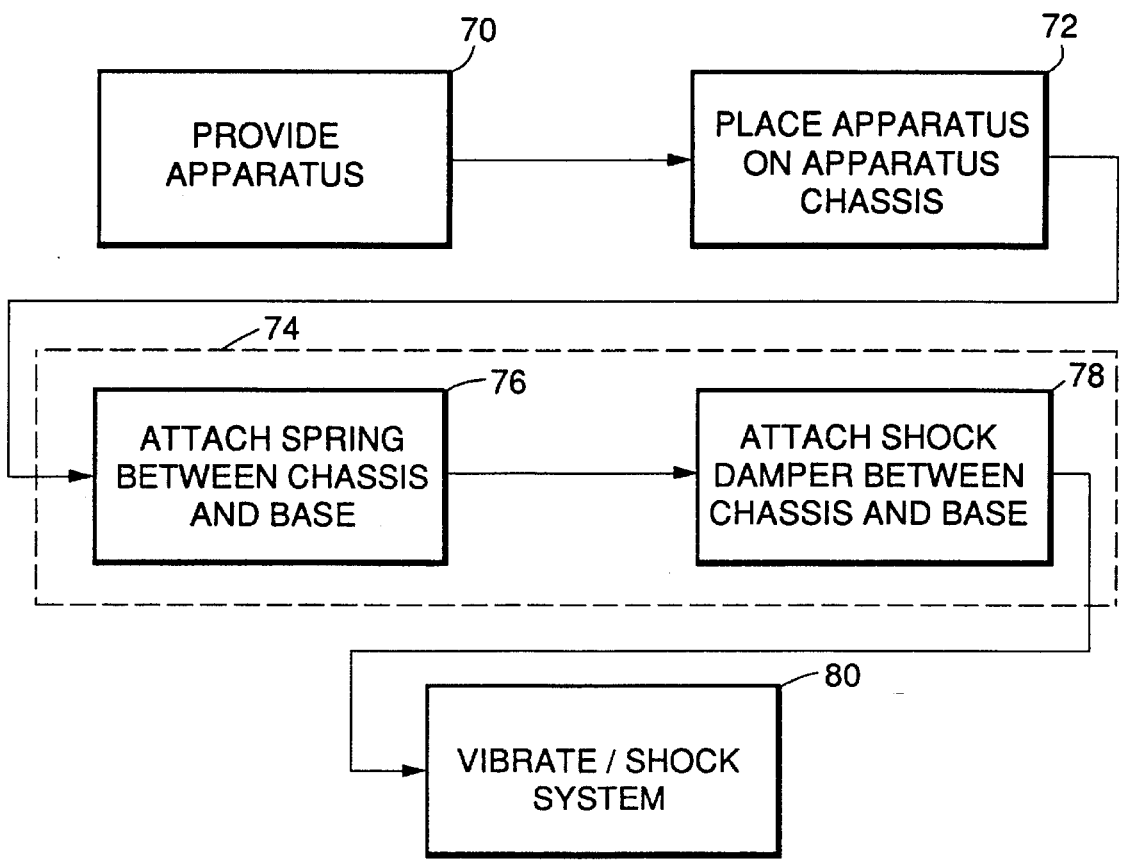
FIG. 7 is a process block flow diagram for a method in accordance with the invention.

FIG. 7 depicts the steps of an associated method for stabilizing an apparatus on board a ship against vibration and shock. The apparatus 22 to be protected is provided, numeral 70. This apparatus 22 is placed into or affixed to the apparatus chassis 24, numeral 72. The apparatus chassis 24 and supported from the base 25, numeral 74. In the illustrated preferred approach, the supporting is achieved by attaching two self-centering, preloaded springs 28 between the apparatus chassis 24 and the base 26, numeral 76, and by attaching two shock dampers 52 between the apparatus chassis 24 and the base 26, numeral 78. The stabilization is complete, and there remains only the subjecting of the system to vibrations and shock in the manner discussed previously, numeral 80.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A bi-directional shock isolation mounting system, comprising:
   an apparatus;
   a base;
   an apparatus chassis that carries the apparatus and is vertically slidable with respect to the base; and
   means for supporting the apparatus chassis from the base, the means for supporting including
      at least one self-centering preloaded spring attached between the base and the apparatus chassis said self-centering preloaded spring further including an internal guide rod slidingly connecting the apparatus chassis and the base, and
      at least one shock damper attached between the apparatus chassis and the base.

2. The bi-directional shock isolation mounting system of claim 1, wherein the base includes a cabinet, the apparatus chassis is disposed within the cabinet, and the apparatus chassis is slidable within the cabinet.

3. The bi-directional shock isolation mounting system of claim 1, wherein the means for supporting includes two self-centering preloaded springs attached between the base and the apparatus chassis said self-centering preloaded springs further including internal guide rods slidingly connecting the apparatus chassis and the base.

4. The bi-directional shock isolation mounting system of claim 1, wherein the means for supporting includes two shock dampers attached between the apparatus chassis and the base.

5. The bi-directional shock isolation mounting system of claim 1, wherein the apparatus chassis includes
   a substantially rectangular chassis top upon which the apparatus rests, the chassis top having a first pair of oppositely disposed corners and a second pair of oppositely disposed corners, and wherein the means for supporting includes
      two self-centering preloaded springs attached between the base and the apparatus chassis, the springs being attached to the rectangular chassis top at the first pair of corners, said self-centering preloaded springs further including internal guide rods slidingly connecting the apparatus chassis and the base and
      two shock dampers attached between the apparatus chassis and the base.

6. The bi-directional shock isolation mounting system of claim 5, wherein the shock dampers are attached to the rectangular chassis at the second pair of corners.

7. The bi-directional shock isolation mounting system of claim 1, wherein the at least one shock damper is a liquid-filled shock damper.

8. The bi-directional shock isolation mounting system of claim 1, wherein the apparatus includes a video monitor.

9. The bi-directional shock isolation mounting system, comprising:
   an apparatus;
   a cabinet;
   an apparatus chassis that carries the apparatus, is disposed within the cabinet, and is vertically slidable with respect to the cabinet in a vertically sliding direction;
   two oppositely disposed, self-centering preloaded springs attached between the cabinet and the apparatus chassis to permit motion in the vertically sliding direction, said self-centering preloaded springs further including internal guide rods slidingly connecting the apparatus chassis and the base; and
   two shock dampers attached between the apparatus chassis and the cabinet in the sliding direction.

10. The bi-directional shock isolation mounting system of claim 9, wherein the apparatus includes a video monitor.

11. A method for stabilizing an apparatus against bi-directional vibration and shock, comprising the steps of:
   providing an apparatus;
   placing the apparatus on an apparatus chassis
   supporting the apparatus chassis from a base so that the apparatus chassis is vertically slidable with respect to the base in a generally vertical direction, the step of supporting including the steps of
      attaching at least one self-centering preloaded spring between the base and the apparatus chassis, said self-centering preloaded spring further including an internal guide rod slidingly connecting the apparatus chassis and the base, and
      attaching at least one shock damper between the apparatus chassis and the base.

12. The method of claim 11, wherein the step of supporting includes the steps of
   attaching two self-centering preloaded springs between the base and the apparatus chassis, said self-centering preloaded springs further including internal guide rods slidingly connecting the apparatus chassis and the base, and
   attaching two shock dampers between the apparatus chassis and the base.

13. The method of claim 11, wherein the step of placing the apparatus on an apparatus chassis includes the step of providing an apparatus chassis having a substantially rectangular chassis top, the chassis top having a first pair of oppositely disposed corners and a second pair of oppositely disposed corners, and wherein the step of attaching two self-centering preloaded springs includes the step of attaching one of the self-centering preloaded springs at each of the first pair of corners, and attaching one of the shock dampers at each of the second pair of corners.

* * * * *